Figure 1:
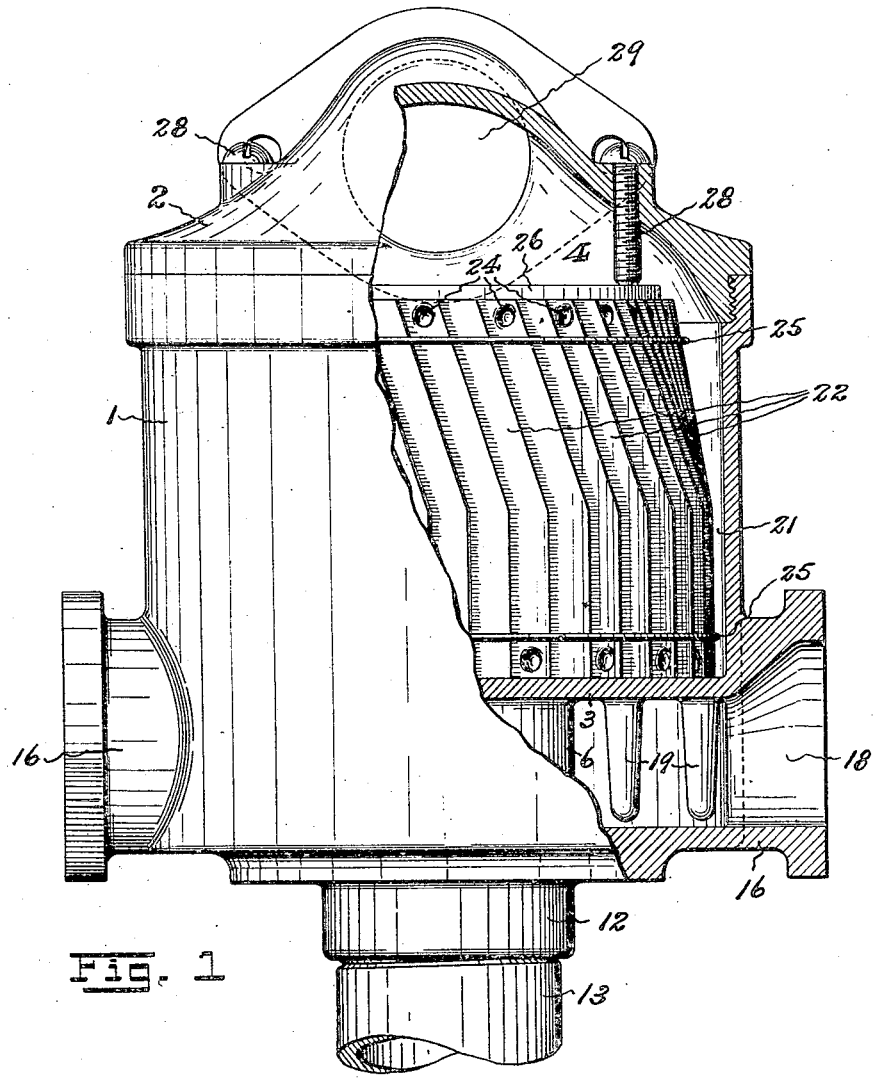

Oct. 9, 1928.  
E. R. GODWARD  
1,686,610  
PROCESS OF PRODUCING DRY GASEOUS FUEL  
Filed Oct. 23, 1925  
4 Sheets-Sheet 1

INVENTOR.  
Ernest R. Godward,  
BY  
Frantzel and Richards  
ATTORNEYS.

Oct. 9, 1928.

E. R. GODWARD 1,686,610

PROCESS OF PRODUCING DRY GASEOUS FUEL

Filed Oct. 23, 1925     4 Sheets-Sheet 2

INVENTOR.
Ernest R. Godward,
BY
Frantzel and Richards
ATTORNEYS.

Oct. 9, 1928.  
E. R. GODWARD  
1,686,610  
PROCESS OF PRODUCING DRY GASEOUS FUEL  
Filed Oct. 23, 1925  
4 Sheets-Sheet 3

INVENTOR.  
Ernest R. Godward,  
BY  
Frantzel and Richards  
ATTORNEYS.

Oct. 9, 1928.

E. R. GODWARD 1,686,610

PROCESS OF PRODUCING DRY GASEOUS FUEL

Filed Oct. 23, 1925    4 Sheets-Sheet 4

INVENTOR.
Ernest R. Godward,
BY
Fraentzel and Richards
ATTORNEYS.

Patented Oct. 9, 1928.

1,686,610

UNITED STATES PATENT OFFICE.

ERNEST R. GODWARD, OF NEW YORK, N. Y., ASSIGNOR TO THE ECLIPSE PETROL ECONOMISER SYSTEM COMPANY, LIMITED, OF CHRISTCHURCH, NEW ZEALAND, A CORPORATION OF NEW ZEALAND.

PROCESS OF PRODUCING DRY GASEOUS FUEL.

Application filed October 23, 1925. Serial No. 64,476.

This invention relates to a process of producing a substantially dry gaseous air and fuel mixture for internal combustion engines and other uses from a mechanical or wet mixture of air and entrained particles of volatile liquid fuel, such, e. g., as liquid hydrocarbons.

The object of this invention is to subject the liquid portions of moving streams of a mechanical or wet mixture of air and more or less volatile liquid fuel to a practically simultaneous treatment including a time factor, a relatively extended surface factor, and a heating factor, in the presence of successive oncoming portions of said streams, to the end that both the heavier constituents as well as the lighter and more readily volatilized constituents of said liquid fuel are completely vaporized or converted into a desired substantially dry gaseous fuel, which is especially adapted for use as a fuel for internal combustion engines.

After a long study of the ordinary methods of carburetion, and as a result of extended experiments to determine the best method of gasifying the liquid portions of the wet or mechanical mixture of air and volatile liquid fuel, which is the product of the well known types of carbureters or mechanical mixing devices now in use, especially in connection with internal combustion engines, I have discovered and applied a certain novel procedure making for complete vaporization of the entire range of liquid fuel constituents carried in suspension in an air stream, according to their varying degrees of volatility or boiling point, without unduly restricting or impeding the free flow or movement of the initial mixture or of the resultant dry gaseous mixture to the place of use.

It will be understood that in any initial stream of wet or mechanical mixture of air and volatile liquid fuel, many of the lighter constituents, i. e. those of sensitive volatility, will, almost immediately they join the air stream, volatilize or vaporize so as to be absorbed by the latter, while the heavier or less readily volatilized fuel constituents will tend to retain their liquid character. One of the most important factors necessary to volatilization of such heavier fuel constituents is time, and one of the problems attendant on complete vaporization is to provide time for the treatment of such constituents in assistance of other volatilizing factors, without unduly interfering with, delaying, restricting or impeding the free movement of the mixture stream of air and already volatilized and absorbed fuel. Another important factor in this connection, which is more or less closely identified with the time factor, relates to the separation of the unvolatilized heavier fuel constituents from the mixture stream, and the support of the same during a space of time sufficient for and in assistance of the volatilizing treatment thereof; this factor is provided for by supplying a contact surface of relatively great area contiguous to the moving mixture. A further important factor necessary to complete volatilization of heavier liquid fuel constituents in heat, applied preferably in such manner as to effect a volatilizing treatment in the nature of fractionation.

My novel process involves a procedure in which the factors of time, space, surface and heat are all provided for with mutually cooperative and practically simultaneous effect upon and in contribution to the desired work of volatilizing the heavier constituents of the liquid fuel portions of an initial mixture stream.

By my novel method or process, the initial stream of wet or mechanical mixture of air and volatile liquid fuel is, during a stage of its progress to the place of use, subdivided into a multiplicity of substantially extended relatively thin streams, in such manner that the initial volume thereof is expanded to retard its initial velocity. Upon such subdivision of said initial stream, and while the velocity thereof is thus retarded, provision is made for separating from the resultant divided streams the unvolatilized liquid fuel particles entrained therein. Contiguous to the multiplicity of mixture streams, so as to be presented in contact therewith, I provide extended wall surfaces of substantially great area, upon which the separated unvolatilized liquid fuel particles are deposited and converted into thin film by function of the moving stream. The deposit of these separated liquid fuel particles on said contiguous wall surfaces delays their movement, and provides time for and support during the application of heat for distillation effect in assistance of their volatilization, as well as means to present the same subject to the frictional effects of the mixture streams moving in contact therewith, whereby evaporation thereof is further assisted by the spreading or filming of the liquid particles on the said surfaces. Heat is preferably transferred to the supporting walls for conduction therethrough in a direction opposite to the gravity flow of the liquid fuel particles deposited on said supporting walls, whereby the gravitating liquid fuel particles will progressively meet with increasing temperature, so that the constituents thereof will eventually meet that particular degree of heat corresponding to their individual boiling points, whereupon the same are volatilized and returned into and absorbed by the oncoming mixture streams. Finally the multiplicity of mixture streams, ultimately consisting of air and absorbed volatilized or gaseous fuel elements, are reunited for continued progress to the place of use.

In carrying out my novel method above outlined, it will be evident that the form of apparauts employed may be subject to more or less mechanical variation. As an example and to illustrate my method, I have, in the accompanying drawings, shown one form of apparatus suitable for carrying out my method or process of converting an initial moving stream of wet or mechanical mixture of air and volatile liquid fuel into a substantially dry gaseous fuel mixture for delivery to an internal combustion engine.

Figure 2:
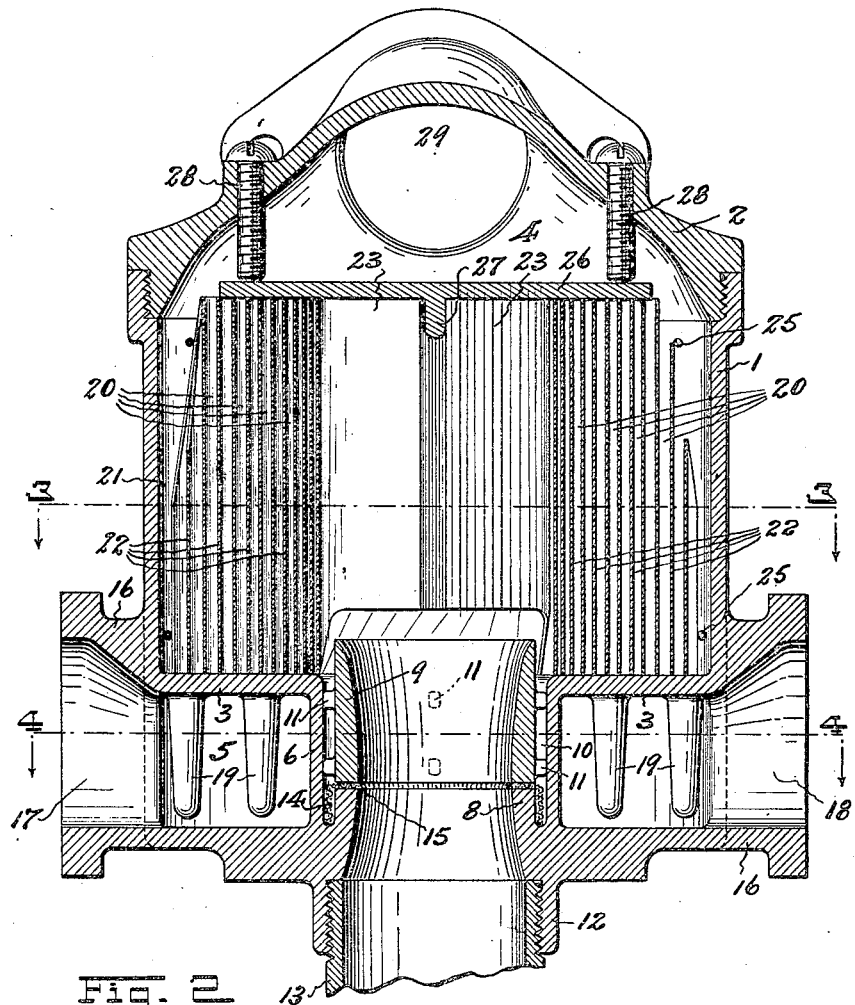
Figure 3:
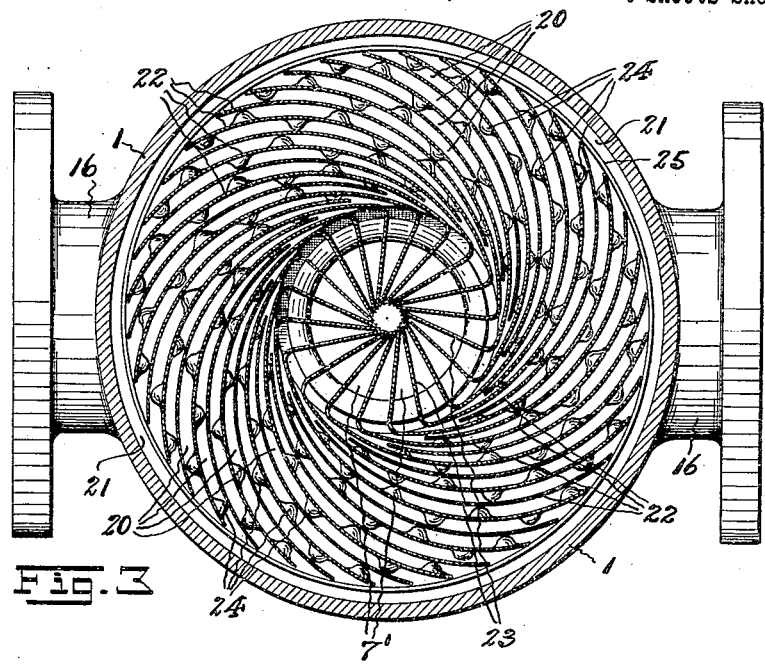
Figure 4:
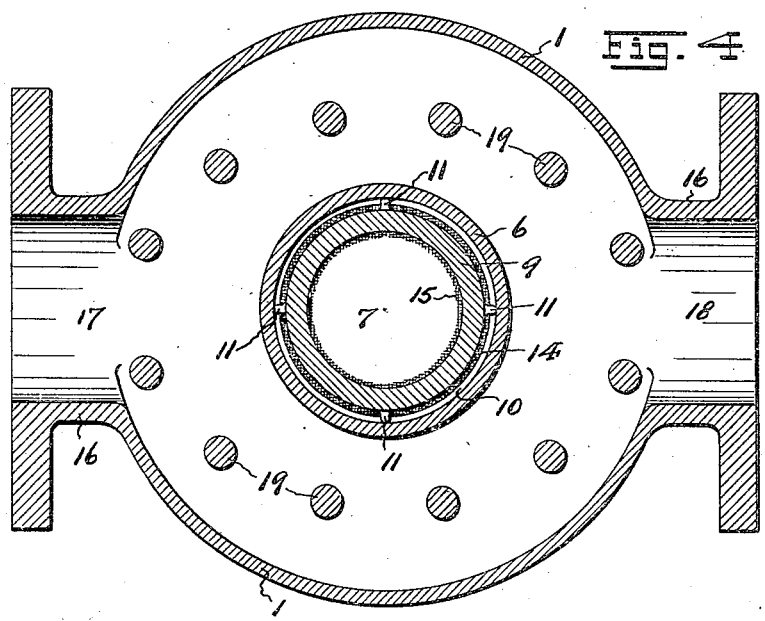
Figure 5:
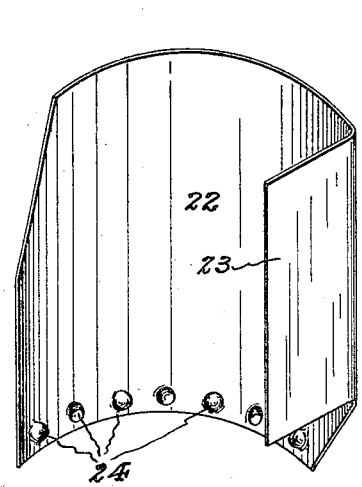
Figure 6:
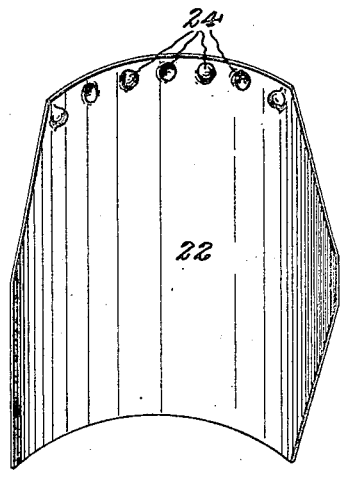
Figure 7:
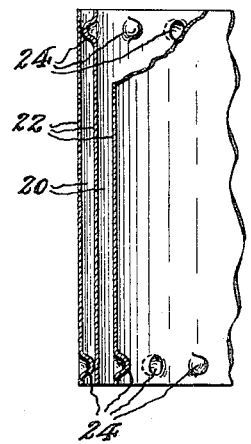

In the accompanying drawings, Figure 1 is a front elevation of a suitable form of apparatus by aid of which my novel method of vaporization may be practiced, the outer casing wall of the same being partially broken away to disclose certain features of the internal structure and arrangement thereof; Figure 2 is a vertical longitudinal section through said apparatus; Figure 3 is a horizontal section through the same, taken on line 3—3 in Figure 2; Figure 4 is another horiontal section, taken on line 4—4 in Figure 2; Figures 5 and 6 are perspective views of plate structures utilized in the apparatus to provide a multiplicity of substantially unrestricted mixture stream passages having contiguous wall surfaces to support the separated heavier fuel constituents and delay their passage a sufficient length of time to permit of their volatilization; and Figure 7 is a fragmentary sectional view to illustrate one manner of assembling said plates together in spaced passage forming relation.

In said drawings the reference character 1 indicates a casing or housing having an open upper end closed by a cover member 2 suitably secured thereto. The interior of said casing or housing is subdivided horizontally by a partition 3, to provide an upper or vaporizing chamber 4 and a lower or heater chamber 5.

The intake for the initial wet or mechanical mixture of air and volatile liquid fuel leads into the lower interior of the vaporizing chamber 4 through a centrally located throat member 6 which rises from the bottom wall of the casing or housing 1 through the interior of the heater chamber 5 to the partition 3. The interior of said throat member 6 is constructed to provide a slightly restricted intake passage 7 in the nature of a Venturi tube, and may consist of a fixed lower tube section 8 and a separable upper tube section 9 alined together. Said lower and upper tube sections 8 and 9 are inwardly spaced from the interior wall surfaces of said throat member 6, to thus provide an intermediate annular well 10, which communicates at its upper end with the interior of said vaporizing chamber 4. Said upper tube section 9 is provided with radially projecting spacer lugs 11, to retain the same in operative alined relation to said lower fixed tube section 8, as well as in properly spaced relation to the interior wall surfaces of said throat member 6. The bottom wall of said casing or housing 1 is provided with an internally threaded coupling boss 12, or any other suitable means, for connecting a fuel mixture supply pipe or conduit 13, leading from an ordinary liquid fuel and air mixing device (such as an ordinary atomizing or other type of carbureter), in communicating relation to said vaporizer intake passage 7. An annular capillary mesh fabric 14, preferably made of relatively fine metallic gauze, is interposed between the meeting or adjoining ends of said lower and upper intake tube sections 8 and 9, so that the inner end of the same depends within the bottom portion of the well 10, while its opposite end is slightly projected, as an annular lip 15 (see Figure 4), into the restricted portion of said intake passage 7.

The casing or housing 1 is provided at opposite sides with lateral extensions or necks 16, respectively providing inlet and outlet passages 17 and 18 leading into and out of the heater chamber 5; whereby, through suitable conduit connections with said extensions or necks 16, a heating medium (such, e. g., as the exhaust gases from an internal combustion engine) may be introduced into and circulated through the heater chamber 5, so as to transfer heat to the bottom wall of said vaporizing chamber 4 provided by said partition 3. To facilitate such transfer of heat to said partition 3, the latter may be provided on its underside with a plurality of heat absorbing fingers or tits 19, which depend within the heater chamber 5, and around which circulates the heating medium introduced into and through the latter.

Arranged within said vaporizing chamber 4, in such manner that their inner ends communicate with the central interior portion thereof into which said intake passage 7 leads, and the size of which determines the initial volume of wet or mechanical mixture subject to treatment, are a multiplicity of substantially radial and laterally extending preferably curved passages 20 which terminate at their outer ends in an annular vertical discharge passage 21 opening into the upper end of said vaporizing chamber. The said passages 20 are formed by a multiplicity of vertical, but preferably laterally arcuate, sheet metal plates 22 so spaced apart one from another as to determine said passages 20. It is preferable to make said plates 22 in two forms; one having at its inner end an angular extension 23 (see Figure 5), and the other being without such angular extension (see Figure 6). These two forms of plates are assembled in alternated relation, so that the angular extensions 23 of alternate plates radially converge within the aforesaid central intake portion above said intake passage 7, thus providing a series of central vertical passages 7' which assist in deflecting the stream of fuel mixture entering said central intake passage of the vaporizer chamber from said passage 7 for equal distribution and movement through the many passages 20, and thus dividing the incoming wet fuel mixture stream into a multiplicity of separate and distinct sheet-like streams which are individually of relatively small volume and large surface. In this manner the total volume of said incoming stream of wet fuel mixture is caused to traverse a substantially great surface area which is provided by the plates 22, the faces of which are contiguous to the streams of fuel mixture flowing through the passages 20 therebetween. The most convenient means for separating or spacing the assembled plates 22 to provide the passages 20, consists in providing the plates, adjacent to a lateral edge thereof, with a row of outwardly pressed or struck spacing tits 24, alternately projecting from opposite sides of the plate. In practice such an arrangement of spacing tits 24 may be provided adjacent to the upper lateral edge of one plate and adjacent to the lower lateral edge of the next or neighboring plate, as shown by the drawings particularly in Figure 7. The plates 22 when assembled together and spaced apart as above described, may be retained in assembled reation by encircling binding hoops 25, or other suitable means. The nest of plates 22 thus constructed and assembled is disposed within the vaporizing chamber 4 so that the lower edges of the plates are supported by and in contact with the partition 3, which thus serves to close the bottom sides of the series of substantially radial and laterally extending preferably curved passages 20. The plates 22 being each in contact with the partitions 3, which is heated by the heating medium circulated beneath the same within the heater chamber 5, permits said plates to receive heat and conduct the same upwardly therethrough for purposes presently to be set forth. The top sides of the series of passages 20 are closed by a top plate 26 which is engaged over the upper end of the nest of plates; the same being held against lateral displacement by a keeper lug 27 which depends from its under side into the space bounded by the converging ends of the angular extension 23 of certain of said plates 22, and being held against vertical displacement by keeper screws 28 which are threaded through said cover member.

As shown in the drawings, said cover member 2 is provided with an outlet passage 29, suitably formed in connection therewith, through which the dry gaseous fuel mixture produced in the vaporizer may be discharged, but it will be understood that the same may be provided with more than one such outlet passage if desired. Suitable conduit connections may be coupled in communication with the said outlet passage for delivering the dry gaseous fuel mixture to the place of use, as e. g. the cylinders of an internal combustion engine. If desired a plurality of outlet passages, such as the passage 29, leading to the engine cylinders may be provided to reduce restriction of fuel mixture movement at high engine speeds, e. g. over 1800 R. P. M.

The method or treatement procedure by which a wet mixture of liquid fuel and air may be converted into a uniformly dry gaseous fuel mixture, and which may be practiced with aid of apparatus such as above described, is as follows:—

Assuming that the apparatus is connected for communication with and between an internal combustion engine and an ordinary carbureter or liquid fuel and air mixing device, the induction strokes of the engine pistons will drawn from the carbureter into the central intake portion of the vaporizing chamber from which the passages 20 extend, by way of the intake passage 7, a stream of air in which are admixed entrained particles of liquid hydrocarbon or other volatile liquid fuel. This stream of liquid fuel and air upon entering said central intake portion within the nest of plates, is immediately caused to divide into a multiplicity of relatively thin sheet-like streams by outward movement through the passages 20 intermediate the plates 22.

It is preferable that the passages 20 be laterally curved from their inner toward their outer ends, and said passages should be very narrow relative to their height and length. In an apparatus adapted to serve internal combustion engines of the average capacities employed for automotive work, the height of the plates 22, and consequently the height of the passages 20, would preferably be from 3 to 4 inches, and their length, or dimension from inner to outer end, would be form 2 to 4 inches with an optimum of 3 inches, or about one-fifth to one-fourth of the circumference of the vaporizing pot or chamber within which the nest of plates is mounted; while the preferred distance of separation of the plates, which determines the width of the passages 20, would be preferably from about 3/32 to 1/8 of an inch. The multiplicity of passages having substantially the relative dimensions above set forth are found to offer but a minimum of impedance to the free movement therethrough of the initial fuel mixture to be treated; and, therefore, while the advantages of mechanical support and sufficient length of time for the treatment of the heavier or less volatile liquid fuel constituents in the manner subsequently explained is assured, there is, nevertheless, no prohibitive restriction imposed on the adequate discharge movement of the resultant dry gaseous fuel mixture as does occur when longer curves or convolutions are used. Within reasonable limits, the wider the distance of separation between the plates, i. e. the wider the passages 20, and the shorter the length of said passages from inner to outer end, the less restriction will occur at high engine speeds.

The combined or aggregate volume or cubic capacity of the multiplicity of passages 20 should be considerably in excess of the volume or cubic capacity of the central mixture intake passage from which said multiplicity of passages 20 extend, and consequently the first effect upon the streams of wet fuel mixture entering said passages 20 is a reduction of their velocity by expansion, while at the same time the curvature of said passages sets up a centrifugal movement of said streams. The expansion and centrifugal movement of the streams tends to separate therefrom the heavier and unvolatilized liquid fuel particles, which are thereupon deposited on the passage walls contiguous to the streams and principally provided by the sides of the plates 22, while the already volatilized lighter fuel constituents which are absorbed by the air travel on for discharge from the passages 20.

The thus separated heavier or less volatile liquid fuel particles, being of relatively higher boiling points, are most easily vaporized by a graded application thereto of heat adapted to effect fractional distillation thereof without decomposition and without overheating the lower boiling constituents of the fuel mixture. Treatment in such manner however requires time. In my novel method the time factor is attained by providing, contiguous to the fuel mixture streams, a very great extent of plate or contact surface area (as already above indicated) upon which the separated heavier liquid fuel particles may be deposited and supported. The fractional distillation effect is attained by applying heat to this great supporting surface area in such manner that the heat is conducted upwardly through the supporting plates to meet the liquid fuel deposits which tend to run down the surfaces thereof by gravitation. By reason of such method of heat application, the temperature is highest at the bottom ends of the supporting plates and diminishes toward the top ends thereof. It follows that the separated and deposited liquid fuel particles in traveling down the plate surfaces will meet with that degree of heat corresponding to the particular boiling points of their constituents, and will consequently be progressively boiled off or vaporized, and thereupon immediately returned as a gaseous element into the streams from which they were initially separated, so as to be absorbed by the air thereof together with the already absorbed volatilized lighter fuel constituents.

A further novel feature of my method resides in the fact that the progressive boiling or vaporization above described is carried on in the presence of the contiguous moving mixture streams, so that, in addition to the vaporization effects of heat, a further assistance to and speeding up of the process of vaporizing the heavier liquid fuel constitutents is attained by the frictional contact of the moving mixture streams with said heavier liquid fuel particles deposited on the supporting plate surfaces. The effect of this frictional contact is to cause said liquid fuel particles to spread out on the supporting plate surfaces in films, increasingly attenuated toward the discharge ends of the passages. The advantages of such effect is two-fold; first, it results in direct vaporization of many of the fuel constituents of grades of volatility intermediate the extreme light and heavy constituents; and, second, by thinning out the heaviest or least volatile of the fuel constituents, it aids in extending the surface thereof and thus renders the same more quickly susceptible to the boiling or vaporizing effects of the applied heat.

In connection with my novel method or treatment procedure thus far outlined, attention must be directed to the very important consideration involved in dividing the initial volume of wet or mechanical mixture of liquid fuel and air into a multiplicity of separate narrow streams of individually small volume, but of aggregate volume considerably in excess of the volume of the inital mixture stream, as determined by the capacity of the central intake portion of the nest of plates from which the many narrow stream passages lead. By reason of the multiplicity of the narrow steam passages the movement of the initial volume of mixture is substantially unrestricted as to its free onward movement, but is, nevertheless, permitted sufficient expansion to retard the velocity of the divided streams within the many narrow passages, in aid of the rapid separation therefrom of the heavier or unvolatilized liquid fuel particles by means of the described centrifugal action; all of which tends to hasten the final production and delivery of the desired resultant dry gaseous fuel mixture. Attention must be further directed to the importance of providing the great extent of contact heating surface area for the support of the separated heavier or unvolatilized liquid fuel particles, especially, since it is the provision of the great extent of supporting surface that contributes to determine the time factor whereby movement of unvolatilized liquid fuel is delayed sufficiently long for adequate application of heat thereto, and premature discharge thereof prevented until it too has been vaporized and absorbed into the moving dry gaseous fuel mixture to be discharged from the vaporizing chamber into the engine cylinders. I have found that it is highly necessary that the total area of supporting surface contiguous to the multiplicity of passages shall be preponderately in excess of the cross sectional area of the initial liquid fuel and air intake portion. It should also be understood that the higher boiling point the liquid fuel is, which is to be vaporized, the greater should be the ratio of area of contact heating surfaces to the cross-sectional area of the initial fuel intake portion, and the greater also should be the ratio of the combined cubic volume of the divided multiple passages to the cubic volume of said initial fuel intake portion. For instance I find that the optimum conditions for vaporizing a motor gasolene conforming to the Bureau of Mines standards with an end boiling point of 437 degrees F., to consist in a ratio of total contact wall surfaces to cross sectional area of the initial fuel intake portion of from 400 to 700 to 1, and should preferably not be less than 200 to 1; and a ratio of total or aggregate cubic content of outgoing passages to the cubic content of the initial fuel mixture intake portion in excess of four and preferably eight or ten to one. For example, I have successfully made a dry gas from such a gasolene fuel in a vaporizer in which the extent of contact wall surfaces was approximately 800 to 1000 square inches to a cross-sectional area of initial fuel intake portion of approximately 2 square inches, and the cubic content of the outgoing passages was about 60 cubic inches compared to approximately 6 cubic inches of initial fuel mixture intake portion. Where, however, a kerosene is to be vaporized instead of a gasolene, the ratio of contact wall surfaces to cross sectional area of the initial fuel intake portion should preferably be multiplied by four or five, and the ratio of cubic content of the outgoing passages to the cubic content of the initial fuel intake portion should also be multiplied in substantially the same proportion. For example, in an experimental vaporizer constructed by me to vaporizer constructed by me to vaporize low grade kerosene for delivery to a 220 H. P. engine of a submarine chaser, and tested upon said submarine chaser with very satisfactory results under varying conditions of load and weather, the extent of heating contact surfaces was approximately 40,000 square inches to a cross sectional area of initial fuel mixture intake portion of approximately 12 square inches, and the cubic content of outgoing passages was approximately 2800 cubic inches compared to about 100 cubic inches of initial fuel mixture intake portion.

When employing my novel method for producing the dry fuel mixture for internal combustion engines, the exhaust gases discharged from the latter may be utilized to furnish the heating medium, the same being passed through the heater chamber 5 so that the heat thereof is transferred to the partition member 3 which forms the bottom of the outgoing passages of the vaporizing chamber. The heat thus delivered to the partition member 3 will be transferred therefrom to the bottom or lower ends of the plates 22, which are in contact with said partition member, and said plates 22 will tend to conduct the heat upwardly through their bodies in a direction opposed to the downward gravitation of the liquid fuel particles deposited upon the same. It will therefore be readily understood, that, as the liquid fuel deposits descend the plate surfaces, they will progressively meet with increasing temperature so that constituents of the liquid fuel particles will eventually meet that particular degree of heat corresponding to their particular boiling points, and consequently will be rapidly boiled off or vaporized. Immediately a liquid fuel constituent is volatilized or gasified by such evaporation, it is liberated from the mechanical support afforded by the plate surface, and, since such plate surface is contiguous to an oncoming moving gaseous fuel stream, it is at once absorbed or merged with said gaseous fuel stream as a combustible element thereof.

Upon issue of the gaseous fuel streams from the multiple passages, the same may again unite in the annular vertical discharge passage as a uniform dry gaseous fuel mixture for discharge through the outlet passage or passages 29 of the vaporizer, and thence may be passed through conduits arranged to deliver the same to the cylinders of the internal combustion engine to be served.

When utilizing my novel method to supply the dry gaseous mixture as a fuel for internal combustion engines, I may provide for the return of any liquid fuel, which by any chance has not been vaporized in the outgoing passages 20, into the incoming initial wet or mechanical mixture for delivery again through the vaporizing passages. This practice is of most advantage in connection with the starting of the internal combustion engine served. When the engine is started from a cold condition, and before the vaporizer receives the full benefit of the heat delivered to its heater chamber 5 by the products of combustion exhausted from the engine, it may happen that liquid fuel deposited on the plates 22 and gravitating on the surfaces thereof will reach the bottoms of the passages 20 before the same are entirely volatilized or vaporized. If this occurs, the liquid accumulating in the bottom of each passage 20 will tend to flow backward therethrough, and will thus move to the mouth of the well 10 into which it will be precipitated. The thus back-drained liquid fuel, when so deposited in the well 10, will be brought into contact with the depending section of the mesh fabric 14, which by its capillary function will take up and carry said liquid fuel from the well to the annular lip 15 disposed within the restricted portion of the intake passage 7, thus presenting or exposing particles of the same to and in contact with the incoming stream of liquid and air, the frictional and suctional pull of which will dislodge the said fuel particles from said lip 15, so that the same enter into and become remixd with said incoming stream for delivery again into the passages 20 of the vaporizing chamber. Once the engine is in continuous operation and the vaporizer receives an adequate supply of the heat medium in the form of hot engine exhaust, the accumulation of unvolatilized liquid fuel subject to the above described back-draining stops, and consequently the redelivering of the fuel to the incoming initial mixture stream ceases, the mechanical aids employed for the purpose becoming inactive.

Owing to the combination in my method of the three factors which combine to produce vaporization of the liquid portion of the fuel charge at comparatively low temperatures, viz, the retardation of the velocity of the fuel stream due to the size of the vaporization chamber, creating the necessary time factor; the great expanse of moderately heated plate surface, upon which the frictional action of the air stream spreads the liquid in extremely thin films, assisting thereby greatly in the vaporization thereof, and the reduced pressure due to engine suction, present in the vaporizing chamber, no excessive heating of the plates is necessary completely to vaporize the heavy ends of the liquid fuel. For instance, where standard motor gasolene with an end point of about 450 degrees F. is used as the motor fuel, a temperature of the plates ranging from 350 degrees F. to 450 degrees F. in the hottest portion and from 150 degrees F. to 200 degrees F. in the cooler upper portion, will be ample completely to vaporize the "heavy ends" or higher boiling fractions of the gasoline.

My method is essentially a single stage selective vaporizing method. Superheating of the once vaporized gasolene is avoided.

With the exhaust heat employed, the relatively great area of vaporizing plate surfaces, preferably proportioned to the size of the intake from the carburetor, taken in conjunction with the varying partial vacuum in the vaporizing chamber at the different throttle openings and the heat-surface-air-time evaporating ratios, a selective vaporization of the liquid gasolene is obtained so rapid and intense under all varying throttle conditions and engine speeds that the latent heat of vaporization so reduces the temperature of the resulting substantially dry homogeneous vaporized carburetted fuel mixture that such temperature is not substantially in excess of the boiling point of the higher boiling constituents in the gasolene; and by "boiling point" I mean partial pressure boiling point or temperature at which the hydrocarbon-air mixture under intake manifold conditions is completely vaporized.

As a result of the comparatively low temperature at which the gas is delivered to the cylinders, there is substantially no loss in volumetric efficiency as in other heating processes, due to overheating of the charge, but on the contrary, there is a very definite increase in brake horse power at wide open throttle, frequently approximating ten per cent or more.

Two other highly important economic results flow necessarily from the complete gasification of the liquid fuel produced by my process, viz; first, the piston heads, spark plugs, cylinder walls, etc., are practically free from carbonization, with a resulting marked reduction in detonation, and secondly, there is practically no dilution of the crank-case oil, due to the fact that no liquid gasoline gets into the cylinders, even at starting from cold. For example, a sample of lubricating oil taken from a single charge of oil that had been run over three thousand miles, on testing, showed only a 7 per cent dilution from the heavy ends of the gasoline, as against 15 to 25 per cent dilution of the lubricating oil usually experienced in the first five hundred miles of driving, in cars not equipped with my process.

As a further economic result of this absence of dilution of the crank-case oil, where my process is used, a lubricating oil of much lighter original viscosity may be used with entirely satisfactory results.

Having thus described my novel method in detail, I claim:—

1. A process of producing a substantially dry gaseous fuel and air mixture from an initial mechanical mixture of air and entrained particles of volatile liquid fuel, comprising initially retarding the velocity of the fuel mixture, and then dividing the stream of said initial mixture into a multiplicity of free unimpeded moving thin streams of relatively great surface area compared to the thickness thereof to which a centrifugal radially directed movement is imparted, contiguous to relatively extended contact surfaces disposed in a substantially vertical plane whereby liquid fuel particles entrained in said divided streams may deposit themselves on said surfaces so as to gravitate thereon, and subjecting said deposited and gravitating liquid particles to heat transmitted along said contact surfaces in a direction opposite to the gravitation of said liquid particles to evaporate the latter in the presence of and for reunion with later on coming portions of said divided initial mixture stream, and finally reuniting said divided streams when freed from entrained liquid particles and charged with the vaporized liquid fuel constituents returned thereinto for delivery to the place of use.

2. In a vaporizer constructed with a central intake member provided with a large number of outgoing narrow arcuate passages, bounded by walls providing a relatively great surface area disposed in substantially vertical plane and with means to transfer heat to said walls; the process of producing a substantially dry gaseous fuel and air mixture from an initial mechanical mixture of air and entrained particles of volatile liquid fuel, comprising the application of heat to the walls of said passages sufficient to maintain the lower parts thereof at a temperature adapted to volatilize the higher boiling fractions of the liquid fuel particles, and initially retarding the velocity of said initial mixture and then subjecting it to centrifugally directed movement through said passages in free unimpeded moving thin streams to give time for evaporization of its entrained liquid particles by contact with the heated walls of said passages.

3. In a vaporizer constructed with a central intake and extending therefrom a substantially ring-like member partitioned to provide a multiplicity of transversely arcuate and radially directed narrow passages bounded by walls of relatively great contact surface area disposed in substantially vertical plane, the aggregate volume of which passages is in excess of four times the cubic volume of said central intake, and with means to transfer heat to said walls; the process of producing a substantially dry gaseous fuel and air mixture from an initial mechanical mixture of air and entrained particles of liquid fuel, which comprises initially retarding the velocity of said initial fuel and air mixture and then subjecting the retarded mixture to centrifugally directed movement by dividing the stream thereof into a multiplicity of substantially free unimpeded moving thin streams within said passages to which a centrifugal movement is imparted contiguous to said relatively extended bounding contact surfaces, thereby causing the liquid fuel particles entrained in said divided streams to be deposited upon said bounding contact surfaces so as to gravitate thereon, and thereupon subjecting said deposited and gravitating liquid particles to heat conducted through said passage walls in a direction opposite to the gravitation of said liquid particles to thereby evaporate the latter in the presence of and for reunion with later oncoming portions of said mixture streams.

4. A method of producing a substantially dry gaseous fuel from an initial stream of mechanically mixed volatile fuel and air containing entrained liquid fuel particles, which comprises initially retarding the velocity of the fuel mixture subdividing said retarded stream into a multiplicity of free unimpeded moving thin streams of relatively great surface area compared to the thickness thereof, changing the direction of the flow of said divided streams into a transverse centrifugal radial movement through narrow radial passages of relatively great height and length compared to their width, causing the liquid particles entrained in said divided streams to deposit upon the laterally arcuate and substantially radially directed metallic bounding walls of said passages, heating said walls progressively in the general direction of the gravity flow upon said walls of said deposited liquid particles, causing said deposited liquid particles to be spread in a progressively thinner and thinner film upon the contact surface provided by said walls by the frictional action of successive oncoming portions of said divided streams, whereby as said deposited liquid particles gradually descend over progressively lower and hotter portions of said contact surfaces the higher and higher boiling fractions of the deposited liquid are successively vaporized and caused to rejoin as a gas the moving streams, and finally recombining the divided streams into a single dry gaseous fuel stream.

5. In a process of producing a substantially dry vaporized carburetted fuel mixture from an initial mechanical mixture of air and entrained liquid fuel particles, in a vaporizer chamber having a central intake and extending therefrom a large number of laterally arcuate and radially directed passages bounded by substantially vertical metallic walls; the step of initially retarding the velocity of said fuel stream and then separating the same into a multiplicity of substantially unimpeded thin streams progressing through said passages with a centrifugal movement, while at the same time supplying heat to said passage walls for upward conduction therethrough.

6. A process of producing a substantially dry vaporized carburetted fuel mixture from an initial mechanical mixture of air and entrained liquid particles of gasolene, which comprises retarding by expansion the velocity of the initial carburetted fuel mixture stream, then subdividing the retarded initial mixture stream into a large number of free unimpeded moving, thin radial streams divided by bounding walls of relatively great surface area and uniformly imparting to said bounding walls graduated temperatures adapted to vaporize the higher-boiling fractions of the entrained liquid fuel deposited on said bounding walls, without overheating the lower-boiling deposited fractions of said entrained liquid fuel, in the presence of the incoming air, and then re-combining said divided streams into a substantially dry homogenous vaporized carburetted fuel mixture having a mixture temperature not substantially in excess of the boiling point of the higher-boiling constituents in the gasolene, for delivery to the engine cylinders.

7. The method of producing, from a wet mechanical mixture of air and entrained liquid hydrocarbons, a substantially dry homogeneous vaporized carburetted fuel mixture, without superheating the latter, for use in internal combustion engines, which comprises retarding by expansion the velocity of the initial mixture stream, dividing the initial mixture stream into a multiplicity of free unimpeded moving thin streams, imparting a centrifugal movement to said streams, causing the entrained particles of liquid fuel to deposit and spread in thin films over radially disposed metallic contact surfaces of relatively great surface area, maintaining said surfaces generally at progressively hotter evaporating temperatures in the direction of the gravity flow of the deposited liquid, and so coordinating and utilizing the factors of partial pressure, velocity, time, extended evaporating surface area, gravity and graduated vaporizing temperatures with the frictional action of the incoming air and the latent heat of vaporization, that such a selective, rapid and intensive evaporation of the liquid fuel particles takes place under substantially all engine speeds as both to vaporize the higher-boiling constituents of the hydrocarbon fuel without materially overheating the lower-boiling fractions, and to produce for delivery to the engine cylinders a resultant vaporized homogeneous carburetted fuel mixture having a mixture temperature not substantially in excess of the boiling point of the higher-boiling constituents in the liquid hydrocarbon fuel.

8. The method of producing, from a wet mechanical mixture of air and entrained particles of liquid fuel, a substantially dry homogeneous vaporized carburetted fuel mixture, for use in internal combustion engines, which comprises retarding the velocity of the initial fuel and air mixture dividing the initial mixture into a multiplicity of free unimpeded moving thin streams, and uniformly subjecting the entrained liquid portions of said streams to the vaporizing action of a multiplicity of metallic contact surfaces of relatively great combined surface area, uniformly so disposed that the liquid portions of the mixture streams will deposit themselves thereon, and uniformly maintaining said contact surfaces at progressively increasing temperatures in the direction of the gravity flow of the deposited liquid fuel so that the lower-boiling portions of the deposited liquid fuel selectively vaporize, without overheating, upon the cooler portions of said contact surfaces and the higher-boiling portions of the deposited liquid fuel in turn selectively vaporize upon the hotter portions of said contact surfaces, the relatively great area of the heated contact surfaces combined with the frictional action of the incoming air and the partial pressures causing so rapid and intense an evaporation of all parts of the deposited liquid fuel that the absorption of heat in evaporation reduces the temperature of the resultant vaporized caburetted fuel mixture to such a degree that its temperature is not substantially in excess of the boiling point of the higher-boiling fractions in such liquid fuel.

9. A method of producing a substantially dry gaseous fuel, which comprises initially retarding the velocity of an initial fuel and air mixture containing entrained liquid fuel particles, then dividing said initial mixture into a multiplicity of free unimpeded moving thin streams of relatively great surface area compared to the thickness thereof; producing a centrifugal movement of said divided streams between walls of relatively great surface extent contiguous thereto, the combined area of which is in excess of two-hundred times the cross sectional area of the initial mixture stream, to separate unvolatilized liquid fuel therefrom for deposit on said wall surfaces; supplying heat to said walls for conduction therethrough in a direction opposite to the gravity flow of liuqid fuel deposited on said wall surfaces, whereby said gravitating deposited liquid fuel is subject to fractional evaporation in the presence of said divided streams and finally combining said divided streams to provide the resultant discharged volume of dry gaseous fuel.

In testimony that I claim the invention set forth above I have hereunto set my hand this 16th day of October, 1925.

ERNEST R. GODWARD.